US009064132B1

(12) United States Patent
Laird et al.

(10) Patent No.: US 9,064,132 B1
(45) Date of Patent: Jun. 23, 2015

(54) METHOD FOR WRITING HARDWARE ENCRYPTED BACKUPS ON A PER SET BASIS

(75) Inventors: Bryan C. Laird, Longwood, FL (US); Carl R. Seibert, Oviedo, FL (US); Gregg R. Hamilton, Lake Mary, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1099 days.

(21) Appl. No.: 12/059,629

(22) Filed: Mar. 31, 2008

(51) Int. Cl.
*G06F 21/62* (2013.01)

(52) U.S. Cl.
CPC ............ *G06F 21/6227* (2013.01); *G06F 21/62* (2013.01)

(58) Field of Classification Search
CPC ....... H04L 9/08; G06F 21/62; G06F 21/6209; G06F 21/6227
USPC ............................ 711/162; 713/193; 380/277
See application file for complete search history.

(56) References Cited

U.S. PATENT DOCUMENTS

| | | | | |
|---|---|---|---|---|
| 5,680,640 | A  * | 10/1997 | Ofek et al. ...................... 710/19 |
| 5,982,572 | A  * | 11/1999 | Dahlerud ...................... 360/72.2 |
| 6,223,262 | B1 * | 4/2001  | Cadden et al. ................ 711/154 |
| 6,675,257 | B1 * | 1/2004  | Khalid et al. ................. 711/111 |
| 6,898,610 | B2 * | 5/2005  | Hose et al. ............................ 1/1 |
| 7,490,248 | B1 * | 2/2009  | Valfridsson et al. .......... 713/193 |
| 7,581,110 | B1 * | 8/2009  | Probasco ...................... 713/181 |
| 7,634,583 | B2 * | 12/2009 | Sagar et al. ................... 709/250 |
| 8,001,087 | B1 * | 8/2011  | Newstadt et al. ............. 707/665 |
| 8,060,473 | B1 * | 11/2011 | Dhumale et al. ............. 707/640 |
| 8,122,120 | B1 * | 2/2012  | Athreya et al. ............... 709/224 |
| 2003/0226026 | A1 * | 12/2003 | Magoshi ....................... 713/193 |
| 2006/0053424 | A1 * | 3/2006  | Koistinen et al. ............. 718/105 |
| 2007/0168396 | A1 * | 7/2007  | Adams et al. ................ 707/200 |
| 2008/0100945 | A1 * | 5/2008  | Boyton et al. .................. 360/48 |
| 2008/0183992 | A1 * | 7/2008  | Martin et al. ................. 711/162 |
| 2009/0233578 | A1 * | 9/2009  | Feder et al. ................... 455/410 |

OTHER PUBLICATIONS

Computerworld "IBM, Sun announce native tape drive encryption," Sep. 13, 2006, http://www.computerworld.com/s/article/9003254/IBM_Sun_announce_native_tape_drive_encryption, retrieved from the internet Apr. 19, 2012, pp. 1.

IBM System Storage TS3500 Tape Library Introduction and Planning Guide, Fifth Edition, Nov. 2007, "IBM 3584 Tape Library," http://publib.boulder.ibm.com/infocenter/ts3500t1/v1r0/topic/com.ibm.storage.ts3500.doc/GA32-0559-04.pdf., retrieved from the internet Apr. 19, 2012, pp. 261.

StorageTek T10000, "High End Tape Drive Holds a Native 500 GB," Sun Microsystems, Inc., Security Encryption, Enterprise IT Planet.com, date posted Sep. 14, 2006, http://63.236.73.76/security/encryption/1131476338,html., retrieved from the internet Mar. 28, 2012, pp. 3.

(Continued)

*Primary Examiner* — Kaveh Abrishamkar
*Assistant Examiner* — Ngoc D Nguyen
(74) *Attorney, Agent, or Firm* — Campbell Stephenson LLP

(57) ABSTRACT

A method is disclosed. The method includes encrypting a first data, wherein the encrypting the first data set is performed using a first key, and the encrypting the first data set is performed using a dedicated encryption circuit. The first data set is stored on a first storage medium. A second data set is encrypted, wherein the encrypting the second data set is performed using a second key, and the encrypting the second data set is performed using the dedicated encryption circuit. The second data set is stored on the first storage medium.

23 Claims, 12 Drawing Sheets

(56) References Cited

OTHER PUBLICATIONS

USAccess: Neoscale CryptoStor FC, CryptoStor for Tape and CryptoStor SAV VPN, NeoScale Systems, "Tape, Fiber Channel & San Encryption," http://www.usaccess-llc.com/neoscale.html, retrieved from the internet Apr. 19, 2012, pp. 1.

Sanstor, "NeoScale's CryptoStor Family of Products," http://www.sanstor.info/neoscale.htm, retrieved from the internet Apr. 19, 2012, pp. 1.

NeoScale, "CryptoStorTape700_datasheet.pdf" http://www.nexstor.co.uk/prod_pdfs/CryptoStorTape700_datasheet.pdf, retrieved from the internet Apr. 19, 2012, pp. 2.

* cited by examiner

METHOD FOR WRITING HARDWARE ENCRYPTED BACKUPS ON A PER SET BASIS

BACKGROUND OF THE INVENTION

1. Field of the Invention

This invention relates to data storage systems and, more particularly, to storing encrypted data in data storage systems.

2. Description of the Related Art

Backup systems are used to protect data against loss. Typically, a backup system includes software that periodically copies user data to a backup storage device (e.g., such as a tape drive). If data is lost (e.g., due to user error or device failure), the backed-up copy of the data can be retrieved from the backup storage device.

Many organizations implement a network-based backup system in order to ensure that the organization's data is regularly backed up. For example, a company can implement a network-based backup system to ensure that employees' data is backed up on a daily basis. Data that is stored on storage devices connected to the network is then backed up at regular intervals.

In prior-art backup systems, hardware-based encryption must be performed on a per-medium basis. Per-medium encryption requires that a single medium, such as a tape, use a single backup key. Per-medium encryption presents several problems. Most prominent among these problems is the loss of compartmentalization of information. Because all data under backup on a single medium uses the same key, any user with access to that key can decrypt all information on the medium. This is particularly undesirable for operations that require compartmentalization of sensitive data between various users. Further, this dependence on a single key per medium discourages the use of a single medium for multiple backup operations, which results in increased cost. Finally, in the event of loss of the medium, cracking a single key enables access to the entire medium. The prior art adequately addresses none of these problems.

SUMMARY OF THE INVENTION

A method is disclosed. The method includes encrypting a first data, wherein the encrypting the first data set is performed using a first key, and the encrypting the first data set is performed using a dedicated encryption circuit. The first data set is stored on a first storage medium. A second data set is encrypted, wherein the encrypting the second data set is performed using a second key, and the encrypting the second data set is performed using the dedicated encryption circuit. The second data set is stored on the first storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
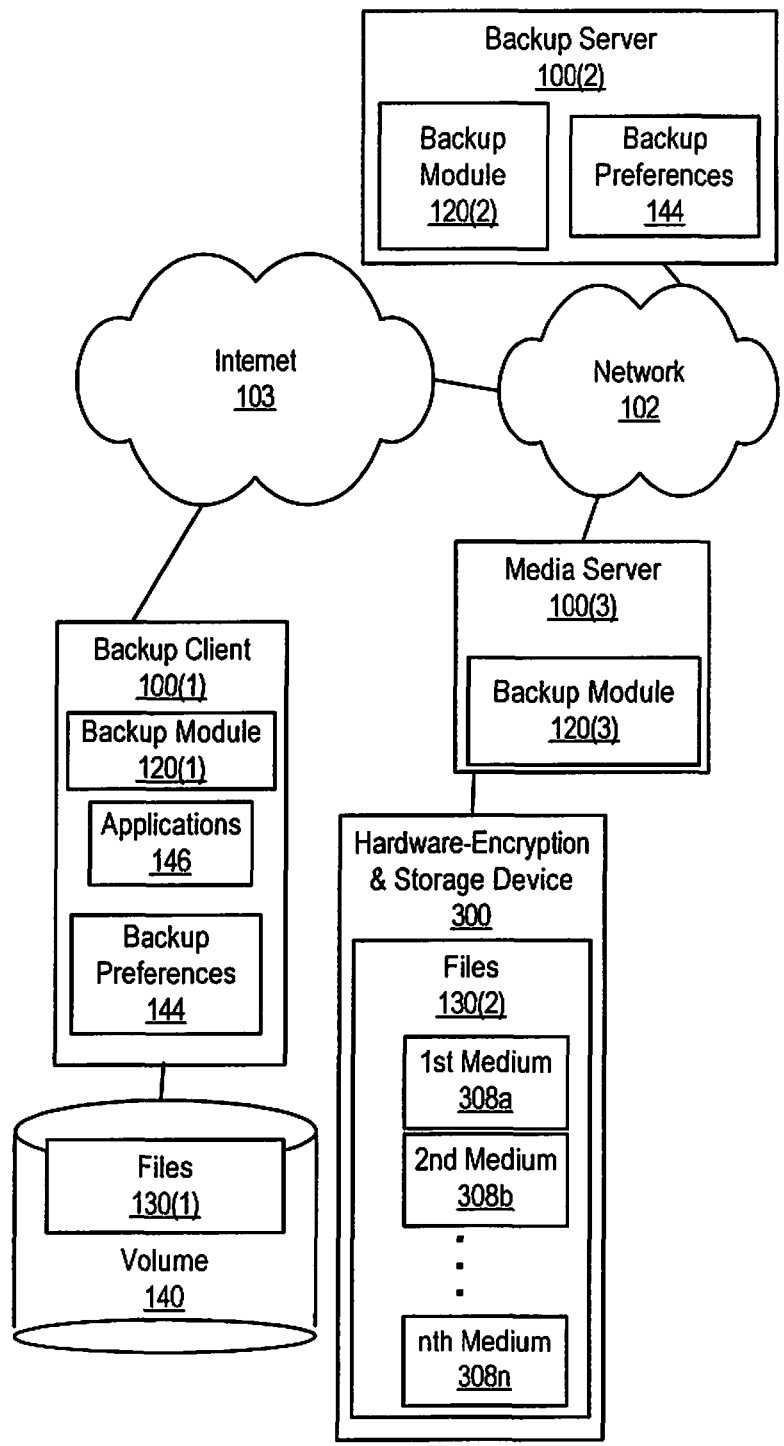
FIG. 1 illustrates a block diagram of a system for performing hardware encrypted backup operations on a per-set basis, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

With reference now to the figures, and in particular with reference to FIG. 1, a block diagram of a system for performing hardware encrypted backup operations on a per-set basis, according to one embodiment of the present invention, is illustrated. FIG. 1 is a block diagram of a data storage system. The components in FIG. 1 can perform backups, full restores from backups, and selective restores of individual files from backups. FIG. 1 includes a backup client 100(1), a backup server 100(2), and a media server 100(3). Backup server 100(2) and media server 100(3) are coupled by a network 102. Backup client 100(1) can also connect directly to network 102. However, in this example, backup client 100(1) is instead coupled to network 102 by Internet 103. In one embodiment, backup client 100(1) can communicate with backup server 100(2) and media server 100(3) (e.g., using a variety of techniques ranging from FTP and HTTP to email and instant messaging), even though backup client 100(1) does not have direct access to network 102.

Network 102 can include one or more WANs (Wide Area Networks), LANs (Local Area Networks), and/or one or more SANs (Storage Area Networks). Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links. In general, a preferred embodiment of network 102 presents a secure network that allows various computing devices to communicate with each other as well as with the backup system that includes backup server 100(2). Network 102 may implement various security techniques, such as firewall techniques.

As shown, backup client 100(1), backup server 100(2), and media server 100(3) each include backup and restore client software or agents implemented by backup modules 120(1), 120(2), and 120(3). Such agents typically receive instructions from backup server 100(2) and handle the extraction and placement of data for the backup client 100(1). Together, the backup and restore agents can backup and restore information stored on the client system. In one embodiment, backup modules 120(1)-120(3) are implemented using VERITAS NetBackup™ or VERITAS BackupExec™ software, available from Symantec Corporation of Cupertino, Calif.

Backup client 100(1) is coupled to (or, alternatively, includes) a storage device, volume 140. Volume 140 is a physical or logical storage device that stores one or more files 130(1). Volume 140 can include one or more physical storage devices (e.g., in one embodiment, volume 140 is implemented on a storage array that includes several independent hard drives). Applications 146 executing on backup client 100(1) can access (e.g., read and write) files 130(1) stored on volume 140. It is noted that in other embodiments, the information stored on volume 140 could be organized using data objects (e.g., database records, object-based storage, and the like) other than files.

Backup server 100(2) includes backup module 120(2), which initiates backups of client data according to backup preferences 144. For example, backup module 120(2) can include a user interface that allows an administrator to specify when client data (such as file data 130(1), which is maintained by backup client 100(1)) should be backed up. Backup module 120(2) can also control media server 100(3) and interact with backup client 100(1). In one embodiment, backup module 120(2) stores information received from a user interface in backup preferences 144.

Media server 100(3) implements backup module 120(3), which participates in backup system operations (such as backups and restores) under direction from backup server 120(2). In this example, backup module 120(3) creates a backup by copying information the information stored on volume 140 to backup media 308a-308n. In one embodiment, backup media 308a-308n are removable media, such as backup tapes, though backup media 308a-308n may be fixed or removable media, depending upon the requirements of a particular embodiment, without departing from the scope of the present invention. As shown, a point-in-time copy (files 130(2)) of files 130(1) can be stored on backup media 308a-308n. Backup media 308a-308n can include sequential storage media such as magnetic tape as well as random access media such as hard disk drives, optical disks (e.g., CDs (Compact Discs) and DVDs (Digital Versatile Discs), and the like). As will be discussed below, backup media 308a-308n can include multiple data sets on a single medium (e.g., medium 308n) encrypted with separate keys, and a single data set of files 130(2) can span multiple backup media 308a-308n.

When backup client 100(1) is not directly connected to network 102, backup module 120(1) is configured to send data (e.g., such as all or part of files 130(1)) that is to be backed up to media server 100(3) using techniques a variety of techniques ranging from FTP and HTTP to email and instant messaging. In particular, backup module 120(1) is configured to collect the necessary data and metadata, which describes the data, package the data and metadata, and send the data and metadata to backup module 120(3).

Backup module 120(1) can send messages that contain backup data in response to requests for backup (e.g., as received from a user or from backup server 100(2)). Backup module 120(1) can also send such messages periodically, at prescheduled times, or in response to certain events.

In one embodiment, backup module 120(1) generates and sends the backup information without user assistance. The backup transaction can be transparent to the user of backup client 100(1), such that the user is unaware that the backup module is sending data to the backup server (or vice versa).

It is noted that, in some embodiments, backup client 100(1) will participate in traditional network-based backup techniques whenever backup client 100(1) is directly connected to network 102. In some such embodiments, backup module 120(1) can detect whether backup client 100(1) is directly connected to network 102 and select which type of backup techniques to use dependent upon whether a direct connection to network 102 is present. Similarly, if restores are being performed, backup module 120(3) can detect whether backup client 100(1) is currently present in the network 102.

Figure 2:
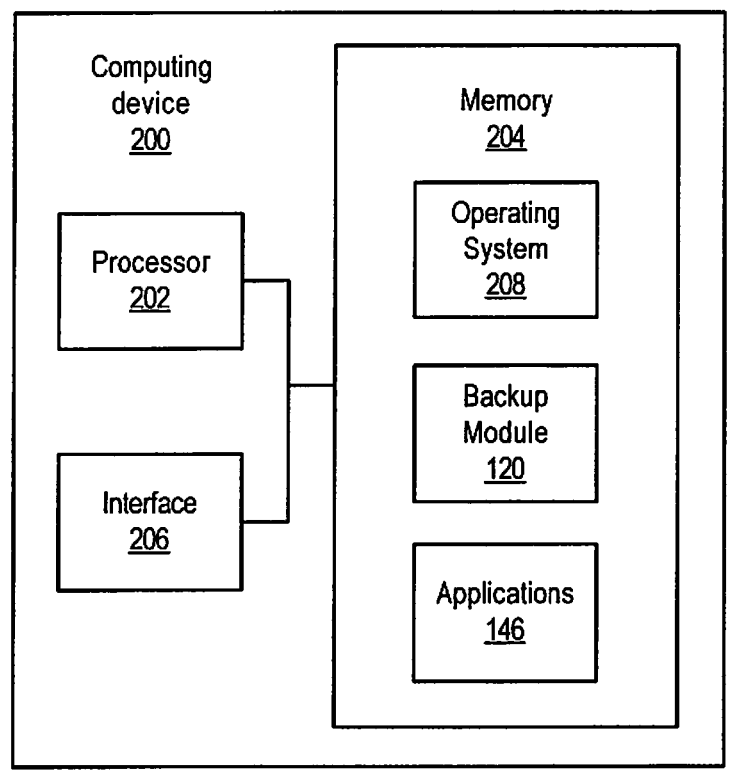
FIG. 2 depicts a block diagram of a computer system configured for performing hardware encrypted backup operations on a per-set basis, according to one embodiment of the present invention.

FIG. 2 depicts a block diagram of a computer system configured for performing hardware encrypted backup operations on a per-set basis, according to one embodiment of the present invention. FIG. 2 is a block diagram of a computing device 200 that implements a backup module 120 (e.g., one of backup modules 120(1)-120(3) of FIG. 1) that can participate in backups and restores including performing hardware encrypted backup operations on a per-set basis, according to one embodiment of the present invention. Computing device 200 can implement backup client 100(1) or media server 100(3) of FIG. 1.

As illustrated, computing device 200 includes one or more processors 202 (e.g., microprocessors, PLDs (Programmable Logic Devices), or ASICs (Application Specific Integrated Circuits)) configured to execute program instructions stored on or in a computer-readable medium such as memory 204. Memory 204 can include various types of RAM (Random Access Memory), ROM (Read Only Memory), Flash memory, MEMS (Micro Electro-Mechanical Systems) memory, and the like. Computing device 200 also includes one or more interfaces 206. Processor 202, memory 204, and interface 206 are coupled to send and receive data and control signals by a bus or other interconnect.

Interface(s) 206 can include an interface to a storage device on which information to be backed up or restored is stored. Interface(s) 206 can also include an interface to a network (e.g., network 102 or Internet 103 of FIG. 1) for use in communicating with a server.

The program instructions and data implementing backup module 120, applications 146 and operating system 208 can be stored on various computer readable media such as memory 204. In some embodiments, such software is stored on a computer readable medium such as a CD (Compact Disc), DVD (Digital Versatile Disc), hard disk, optical disk, tape device, floppy disk, and the like). In order be executed by processor 202, the instructions and data implementing backup module 120 are loaded into memory 204 from the other computer readable medium. The instructions and/or data can also be transferred to computing device 200 for storage in memory 204 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup module 120 are encoded, are conveyed.

Figure 3:
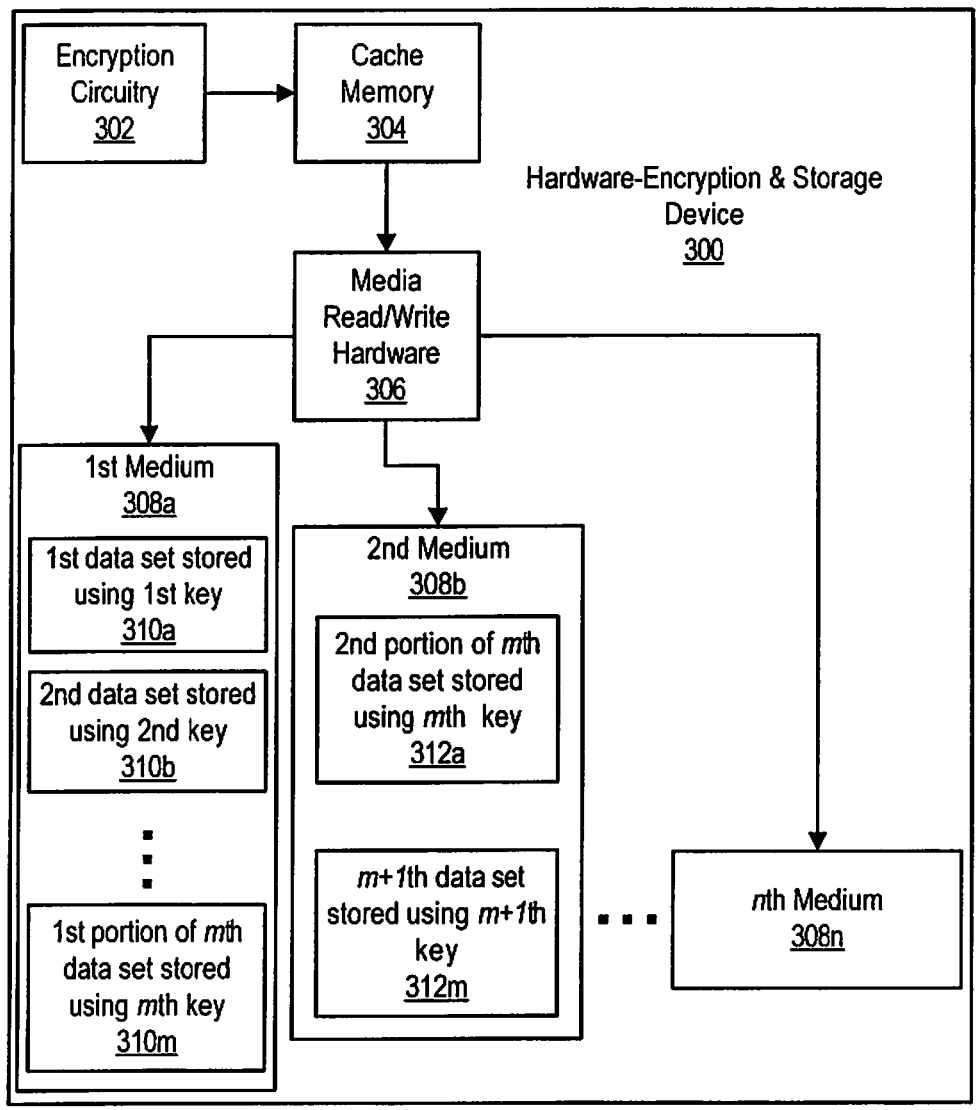
FIG. 3 illustrates a block diagram of a hardware encryption and storage device configured for performing hardware encrypted backup operations on a per-set basis, according to one embodiment of the present invention.

FIG. 3 illustrates a block diagram of a hardware encryption and storage device configured for performing hardware encrypted backup operations on a per-set basis, according to one embodiment of the present invention. Hardware encryption and storage device 300 contains encryption circuitry 302, which provides a dedicated encryption circuit for hardware based encryption of backup data received from media server 100(3). Encryption circuitry 302 is connected to a cache memory 304 for storage of hardware-encrypted backup data prior to writing of hardware-encrypted backup data to one of backup media 308a-308n by media read/write hardware 306.

In one embodiment of the present invention, a first medium 308a contains a first data set stored using a first key 310a and a second data set stored using a second key 310b. First medium 308a may store a variable plurality of hardware-encrypted data sets 310a-310m stored, each encrypted with an individual key. Further, some members of the plurality of data sets 310a-310m may span multiple backup media 308a-308n. As an example, first portion of mth data set 310m is a portion of a data set that is continued on second medium 308b as second portion of mth data set stored using mth key 312a. First portion of mth data set 310m and second portion of mth data set stored using mth key 312a are portions of the same data set, stored with the same key in a manner that spans multiple backup media 308a-308b. Second medium 308b further contains an m+1th data set stored using an m+1th key 312m.

Figure 4:
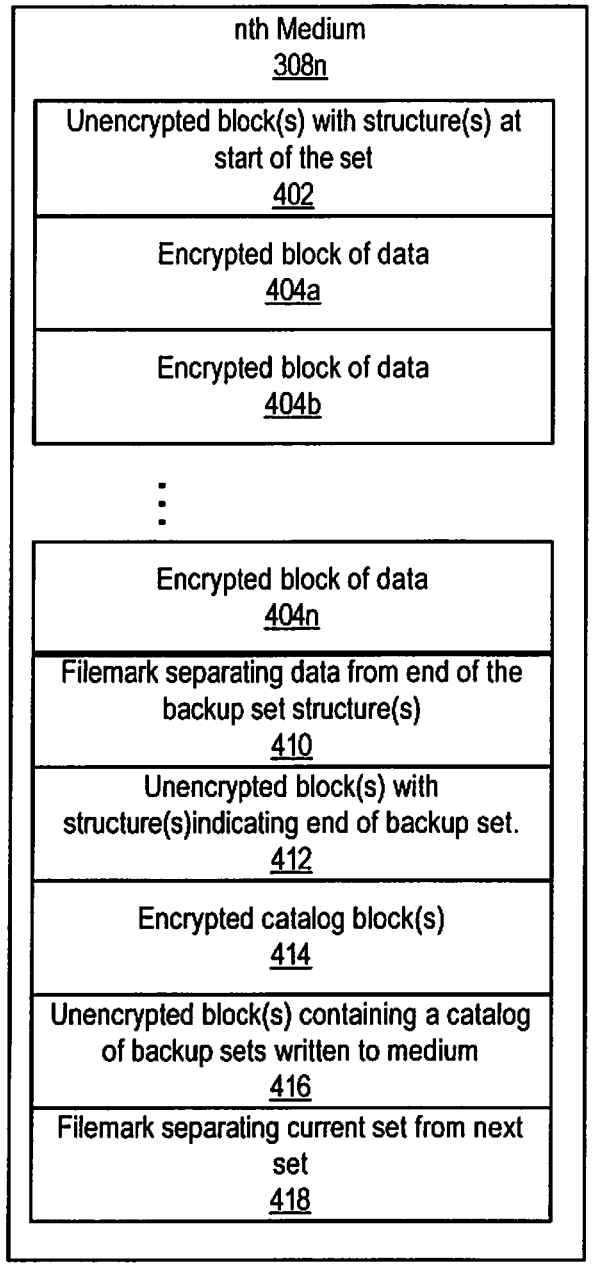
FIG. 4 depicts a block diagram of a storage medium layout for performing hardware encrypted backup operations to a single medium on a per-set basis, according to one embodiment of the present invention.

FIG. 4 depicts a block diagram of a storage medium layout for performing hardware encrypted backup operations to a single medium on a per-set basis, according to one embodiment of the present invention. The storage medium layout for performing hardware encrypted backup operations to a single medium on a per-set basis of FIG. 4 is one exemplary embodiment of nth medium 308n. As depicted, nth medium 308n contains an unencrypted block 402 with data structures containing an encryption key name and hash at the start of a data set.

Nth medium 308n also contains a plurality of encrypted data blocks 404a-404n for storing data. Filemark 410 separates encrypted data blocks 404a-404n from end-of-backup-set data structures. Unencrypted blocks 412 contain structures indicating the end of a backup data set. Encrypted catalog blocks 414 contain a catalog of the data represented by encrypted data blocks 404a-404n. Unencrypted catalog blocks 416 contain a catalog, including a each set's encryption key name and hash, of backup sets written to Nth medium 308n. A filemark 418 separates the data set embodied by blocks 402-418 from a next data set, if one is present.

Figure 5:
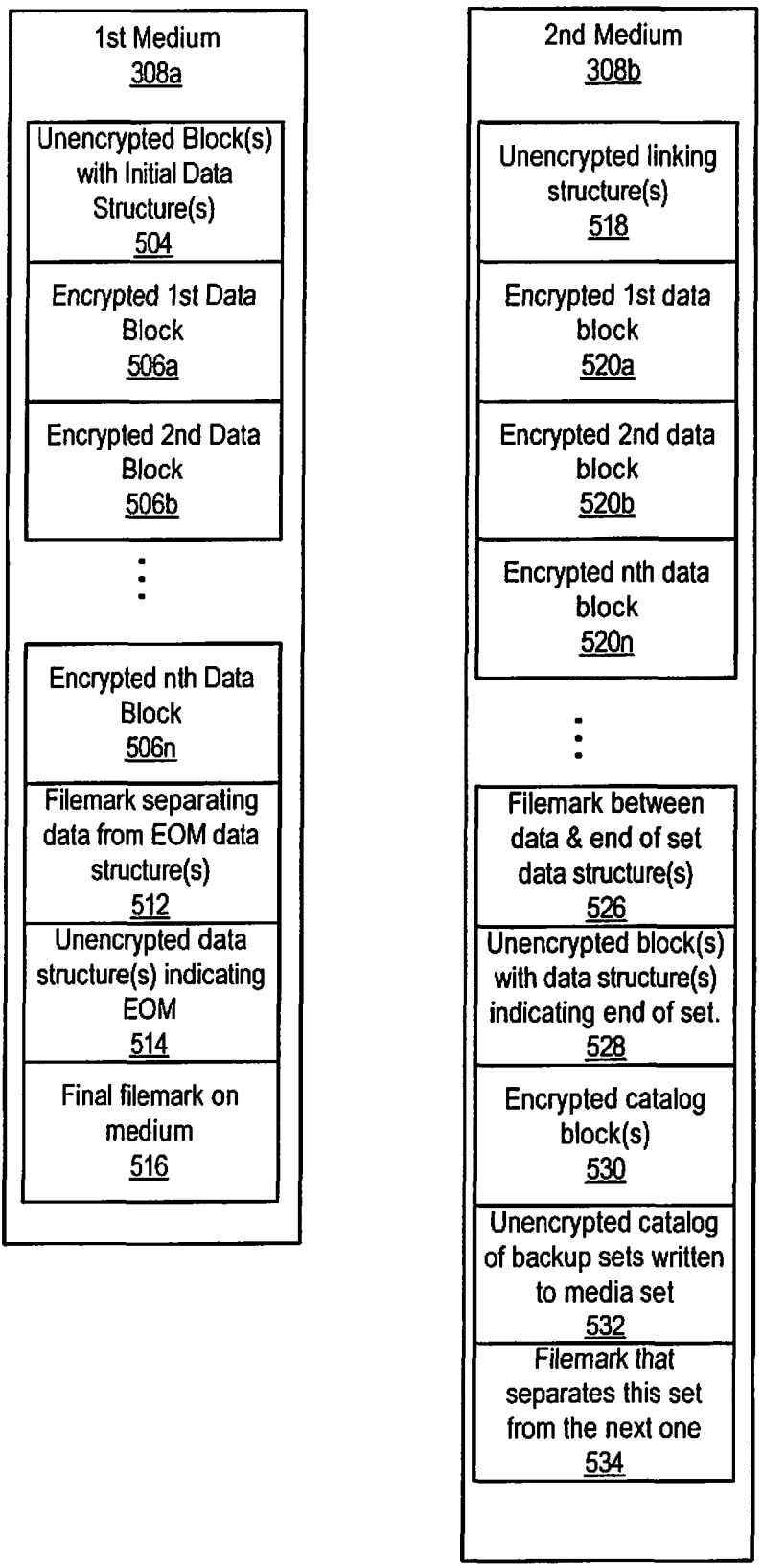
FIG. 5 illustrates a block diagram of a storage medium layout for performing hardware encrypted backup operations spanning multiple media units on a per-set basis, according to one embodiment of the present invention.

FIG. 5 illustrates a block diagram of a storage medium layout for performing hardware encrypted backup operations spanning multiple media units on a per-set basis, according to one embodiment of the present invention. The storage medium layout for performing hardware encrypted backup operations spanning multiple media units on a per-set basis of FIG. 5 is one exemplary embodiment of first medium 308a and second medium 308b. As depicted, first medium 308a contains an unencrypted block 504 with data structures containing an encryption key name and hash at the start of a data set.

First medium 308a also contains a plurality of encrypted data blocks 506a-506n for storing data. Filemark 512 separates encrypted data blocks 506a-506n from end-of-medium data structures. Unencrypted blocks 514 contain structures, which may consume more than one block, indicating the end of first medium 308a, and are followed by a final filemark 516 on medium 308a.

Second medium 308b contains an unencrypted data structure linking second medium 308b to first medium 308a. Second medium 308b also contains a plurality of encrypted data blocks 520a-520n for storing data, which is part of the same data set represented by encrypted data blocks 506a-506n on first medium 308a. Filemark 526 separates encrypted data blocks 520a-520n from end-of-backup-set data structures. Encrypted catalog blocks 530 contain a catalog of the data represented by encrypted data blocks 506a-506n and encrypted data blocks 520a-520n. Unencrypted catalog blocks 532 contain a catalog, including a each set's encryption key name and hash, of backup sets written to second medium 308b and first medium 308a. A filemark 534 separates the data set embodied by blocks 504-534 from a next data set, if one is present.

Figure 6:
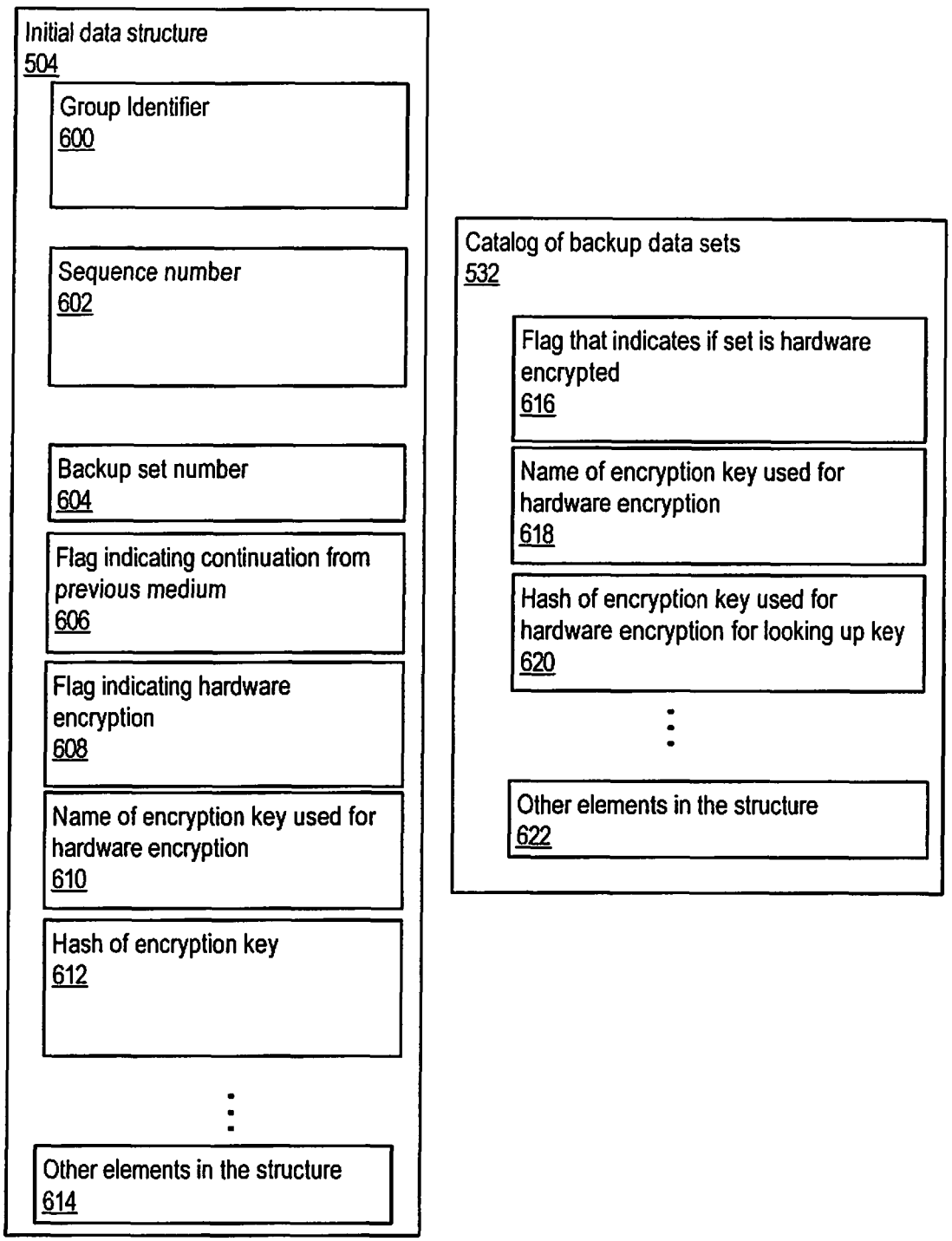
FIG. 6 depicts a block diagram of data structures for performing hardware encrypted backup operations on a per-set basis, according to one embodiment of the present invention.

FIG. 6 depicts a block diagram of data structures for performing hardware encrypted backup operations on a per-set basis, according to one embodiment of the present invention. Initial data structure 504 contains an identifier 600 for a group of media, such as second medium 308b and first medium 308a, which identifies the individual members of the group and links one to one another. Sequence number 602 enables tracking of the order in which members of a group of media, such as second medium 308b and first medium 308a were written. A backup set number 604 identifies the data set spanning second medium 308b and first medium 308a. Initial data structure 504 also includes a name of an encryption key used for the current data set 610 and a hash of the encryption key 608, which is used for key retrieval. Other elements 614 will vary from embodiment to embodiment without departing from the scope of the present invention.

Catalog of backup sets written to media set 532 contains a flag indicating hardware encryption 616. Catalog of backup sets written to media set 532 also includes a name of an encryption key used for the current data set 618 and a hash of the encryption key 620, which is used for key retrieval. Other elements 622 will vary from embodiment to embodiment without departing from the scope of the present invention.

Figure 7:
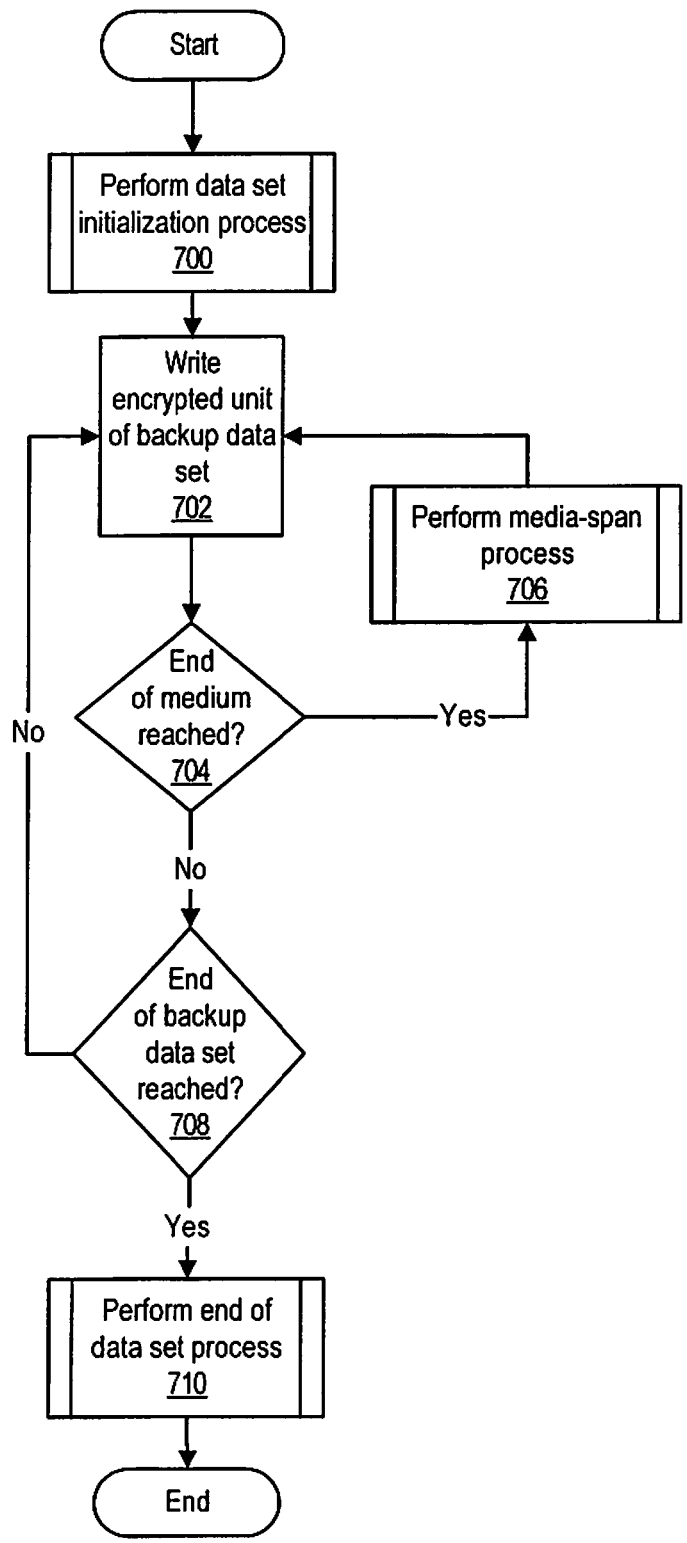
FIG. 7 is a schematic flowchart of a method for performing hardware encrypted backup operations to a single medium on a per-set basis, according to one embodiment of the present invention.

FIG. 7 is a schematic flowchart of a method for performing hardware encrypted backup operations to a single medium on a per-set basis, according to one embodiment of the present invention. After the process is initiated, the process proceeds to step 700, which depicts backup module 120(3) performing an initialization process. The process next moves to step 702. Step 702 illustrates media read-write hardware 306 writing an encrypted unit of a backup data set, such as one of encrypted data blocks 520a-520n. The process then proceeds to step 704, which depicts backup module 120(3) determining whether an end of a medium has been reached. If backup module 120(3) determines that the end of a medium has been reached, the process next moves to step 706. Step 706 depicts backup module 120(3) performing a media-spanning process. The process then returns to step 702, which is described above.

Returning to step 704, if backup module 120(3) determines that the end of a medium has not been reached, the process proceeds to step 708, which depicts backup module 120(3) determining whether an end of a backup set has been reached. If backup module 120(3) determines that the end of a backup set has not been reached, the process then returns to step 702, which is described above. If backup module 120(3) determines that the end of a backup set has been reached, the process next moves to step 710. Step 710 depicts backup module 120(3) performing an end-of-backup process. The process then ends.

Figure 8:
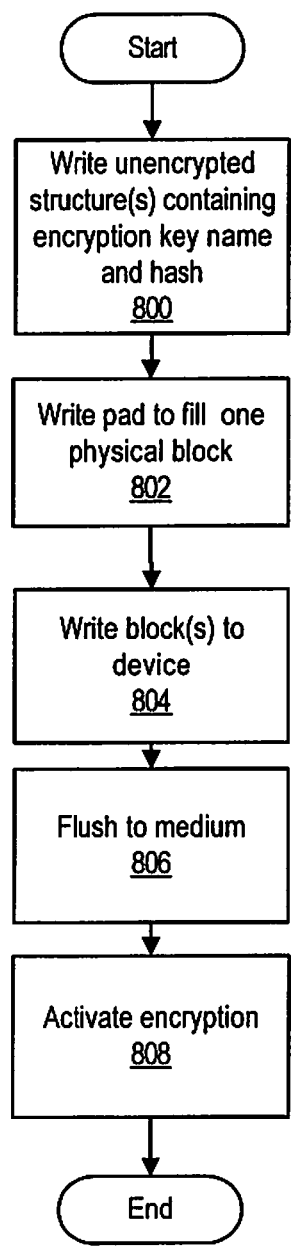
FIG. 8 is a schematic flowchart of a data set initialization process for performing hardware encrypted backup operations on a per-set basis, according to one embodiment of the present invention.

FIG. 8 is a schematic flowchart of a data set initialization process for performing hardware encrypted backup operations on a per-set basis, according to one embodiment of the present invention. The process starts at step 800, which depicts hardware encryption and storage device 300 writing an unencrypted structure containing an encryption key name and hash, such as initial data structures 504. The process next moves to step 802. Step 802 illustrates media read-write hardware 306 writing a pad to fill a physical block of a medium, such as first medium 308*a*. The process then proceeds to step 804, which depicts hardware encryption and storage device 300 writing block data to media read-write hardware 306. The process next moves to step 806. Step 806 illustrates media read-write hardware 306 flushing to a medium, such as first medium 308*a*, blocks written to media read-write hardware 306 in step 804. The process then proceeds to step 808, which depicts media read-write hardware 306 activating encryption. The process then ends.

Figure 9:
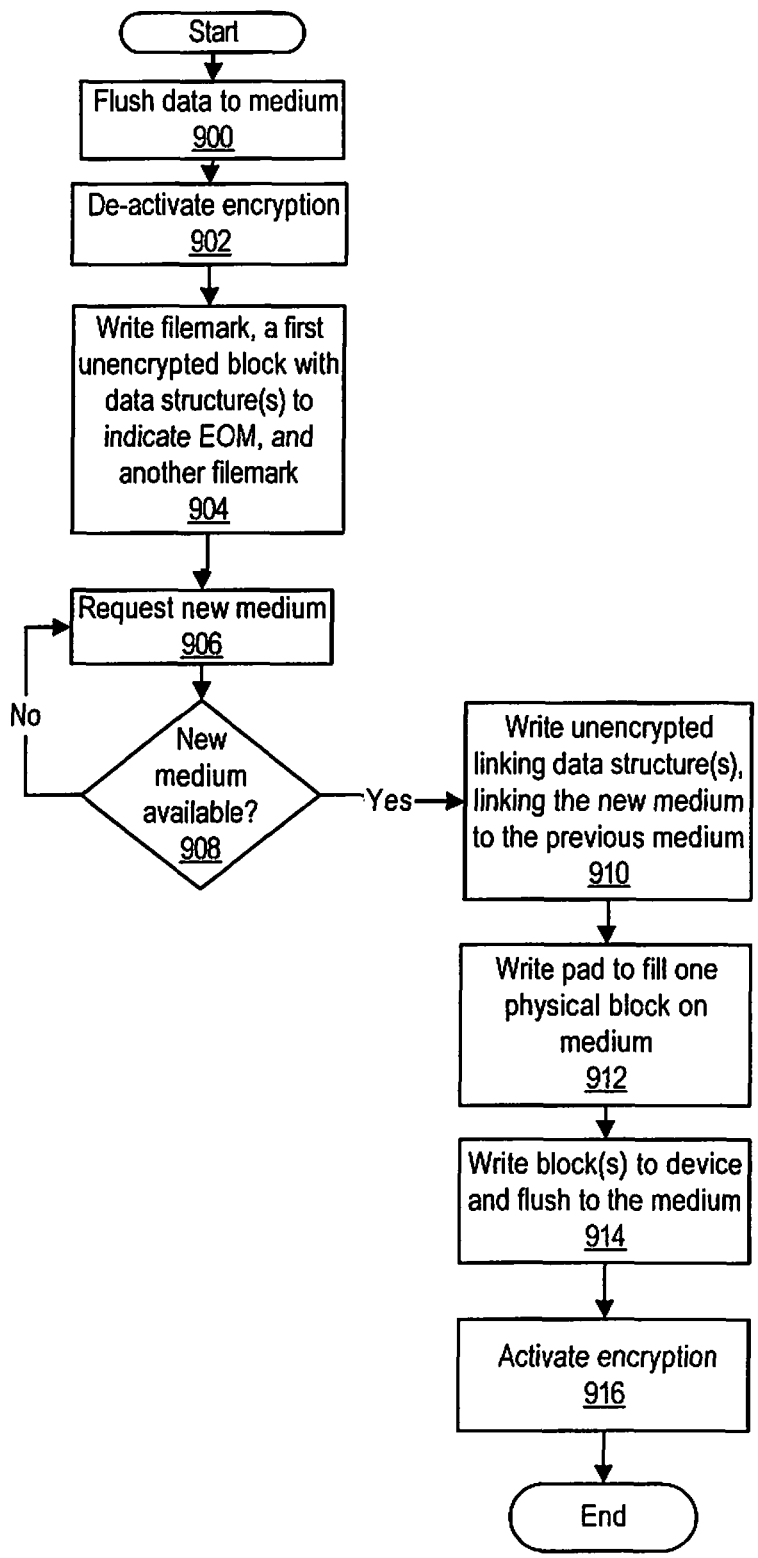
FIG. 9 is a schematic flowchart of a media-spanning process for performing hardware encrypted backup operations on a per-set basis, according to one embodiment of the present invention.

FIG. 9 is a schematic flowchart of a media-spanning process for performing hardware encrypted backup operations on a per-set basis, according to one embodiment of the present invention. After starting, the process proceeds to step 900, which depicts media read-write hardware 306 flushing data to a medium, such as first medium 308*a*. The process next moves to step 902. Step 902 illustrates hardware encryption and storage device 300 de-activating encryption. The process then proceeds to step 904, which depicts hardware encryption and storage device 300 writing a filemark, a first unencrypted block with data structure(s) to indicate the end of a medium, and another filemark. The process next moves to step 906, which indicates backup module 120(3) requesting access to a new medium.

The process then proceeds to step 908, which depicts backup module 120(3) determining whether a new medium is available. If backup module 120(3) determines that a new medium is not available, then the process returns to step 906, which is described above. If backup module 120(3) determines that a new medium is available, then the process next moves to step 910. Step 910 illustrates media read-write hardware 306 writing unencrypted linking data structure(s) 518 linking new medium, such as second medium 308*b* to previous medium, such as first medium 308*a*.

The process then proceeds to step 912. Step 912 illustrates media read-write hardware 306 writing a pad to fill one physical block on the new medium. The process next moves to step 914. Step 914 illustrates hardware encryption and storage device 300 writing blocks to media read-write hardware 306 and media read-write hardware 306 flushing those blocks to the second medium. The process then moves to step 916, which depicts hardware encryption and storage device 300 activating encryption. The process then ends.

Figure 10:
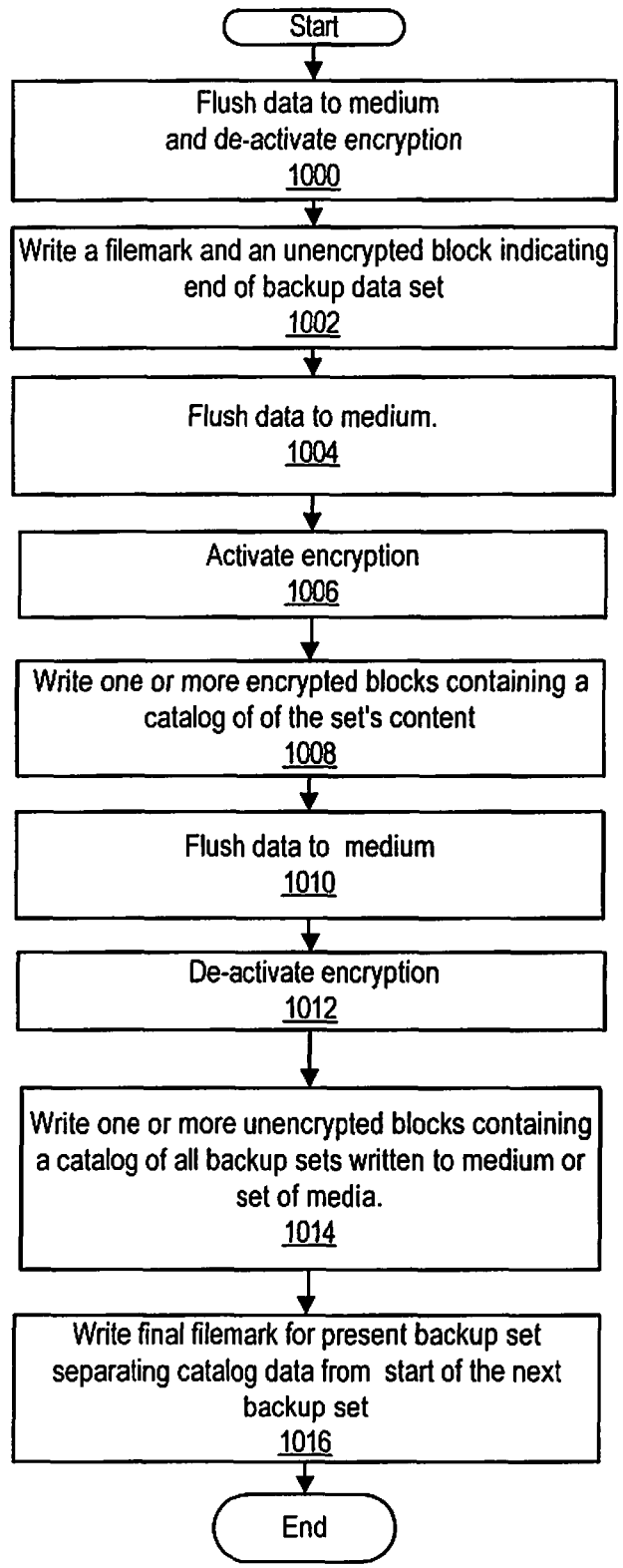
FIG. 10 is a schematic flowchart of an end-of-data-set process for performing hardware encrypted backup operations on a per-set basis, according to one embodiment of the present invention.

FIG. 10 is a schematic flowchart of an end-of-data-set process for performing hardware encrypted backup operations on a per-set basis, according to one embodiment of the present invention. After starting, the process proceeds to step 1000, which depicts media read-write hardware 306 flushing data to a medium and hardware encryption and storage device 300 de-activating encryption. The process next moves to step 1002. Step 1002 illustrates media read-write hardware 306 writing a filemark and an unencrypted data block indicating an end of a data set. The process then proceeds to step 1004, which depicts media read-write hardware 306 flushing data to the medium. The process next moves to step 1006. Step 1006 illustrates hardware encryption and storage device 300 activating encryption.

The process then proceeds to step 1008, which depicts read-write hardware 306 writing one or more encrypted blocks containing a catalog of the data set's content. The process then proceeds to step 1010, which depicts media read-write hardware 306 flushing data to the medium. The process next moves to step 1012. Step 1012 illustrates hardware encryption and storage device 300 de-activating encryption. The process then proceeds to step 1014, which depicts media read-write hardware 306 writing one or more unencrypted blocks containing a catalog of all backup sets written to the medium or set of media. Each catalog entry includes the applicable encryption key name and hash. The process next moves to step 1016. Step 1016 depicts media read-write hardware 306 writing a final filemark for the present backup set separating catalog data from the start of the next backup set. The process then ends.

Figure 11A:
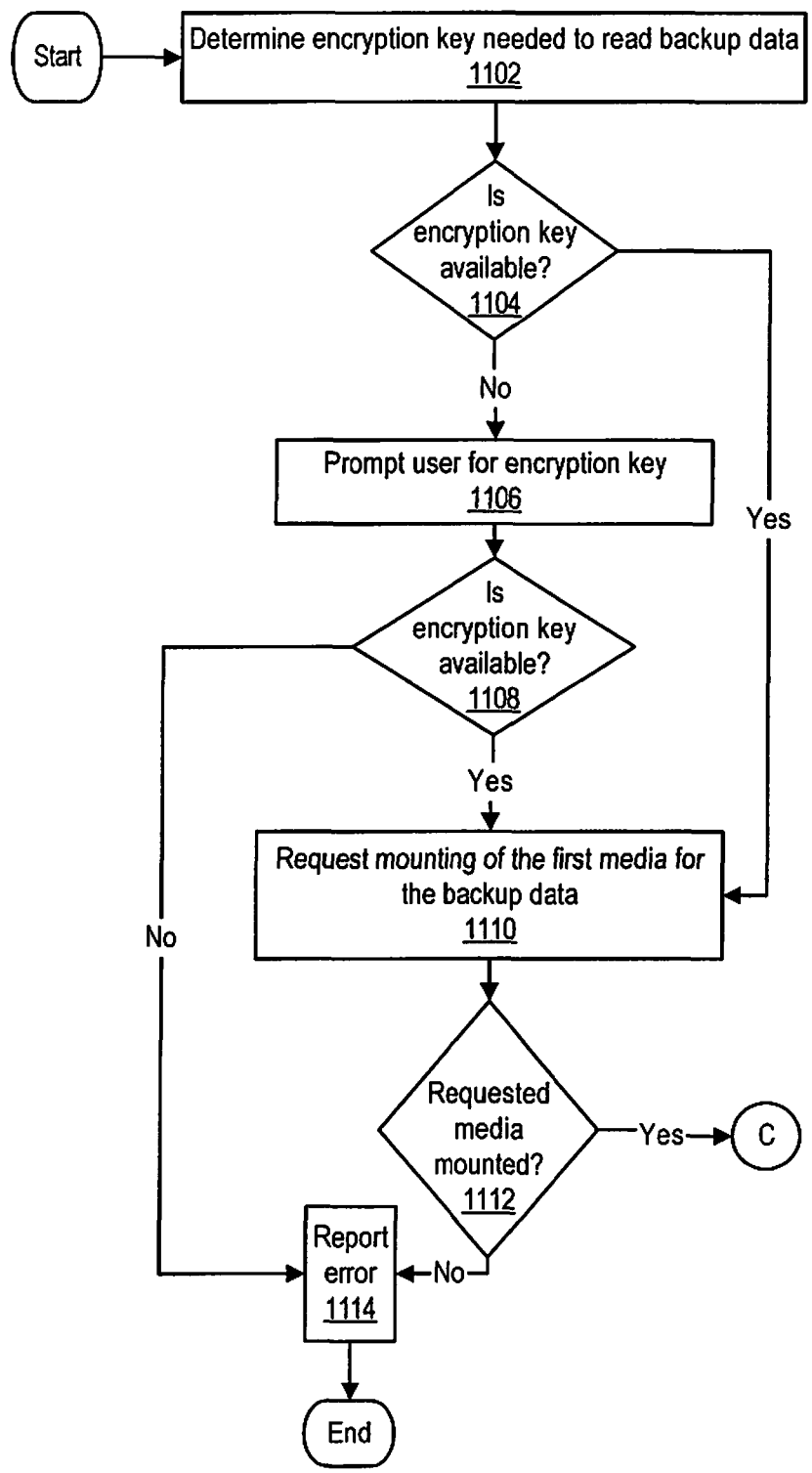
FIG. 11A is a first portion of a schematic flowchart of a method for extracting hardware encrypted backup data on a per-set basis, according to one embodiment of the present invention.

FIG. 11A is a first portion of a schematic flowchart of a method for extracting hardware encrypted backup data on a per-set basis, according to one embodiment of the present invention. After starting, the process proceeds to step 1102, which depicts backup module 120(3) determining what encryption key is needed to read backup data. The process next moves to step 1104. Step 1104 illustrates backup module 120(3) determining whether the encryption key identified in step 1102 is available. If backup module 120(3) determines that the encryption key identified in step 1102 is available, then the process proceeds to step 1110, which is described below. If, however, backup module 120(3) determines that the encryption key identified in step 1102 is not available, then the process proceeds to step 1106, which depicts backup client 100(1) prompting a user for an encryption key. The process then proceeds to step 1108.

Step 1108 illustrates backup module 120(3) determining whether the encryption key identified in step 1102 is available. If backup module 120(3) determines that the encryption key identified in step 1102 is not available, then the process proceeds to step 1114, which depicts backup module 120(3) reporting an error. The process then concludes. Returning to step 1108, if backup module 120(3) determines that the encryption key identified in step 1102 is available, then the process proceeds to step 1110, with backup module 120(3) requesting mounting of first media for backup data. The process then proceeds to step 1112. Step 1112 illustrates backup module 120(3) determining whether the media requested in step 1110 is mounted. If backup module 120(3) determines that the requested media was not mounted, then the process proceeds to step 1114, which is described above. If, however, backup module 120(3) determines that the requested media is mounted, then the process proceeds to step 1116 of FIG. 11B.

Figure 11B:
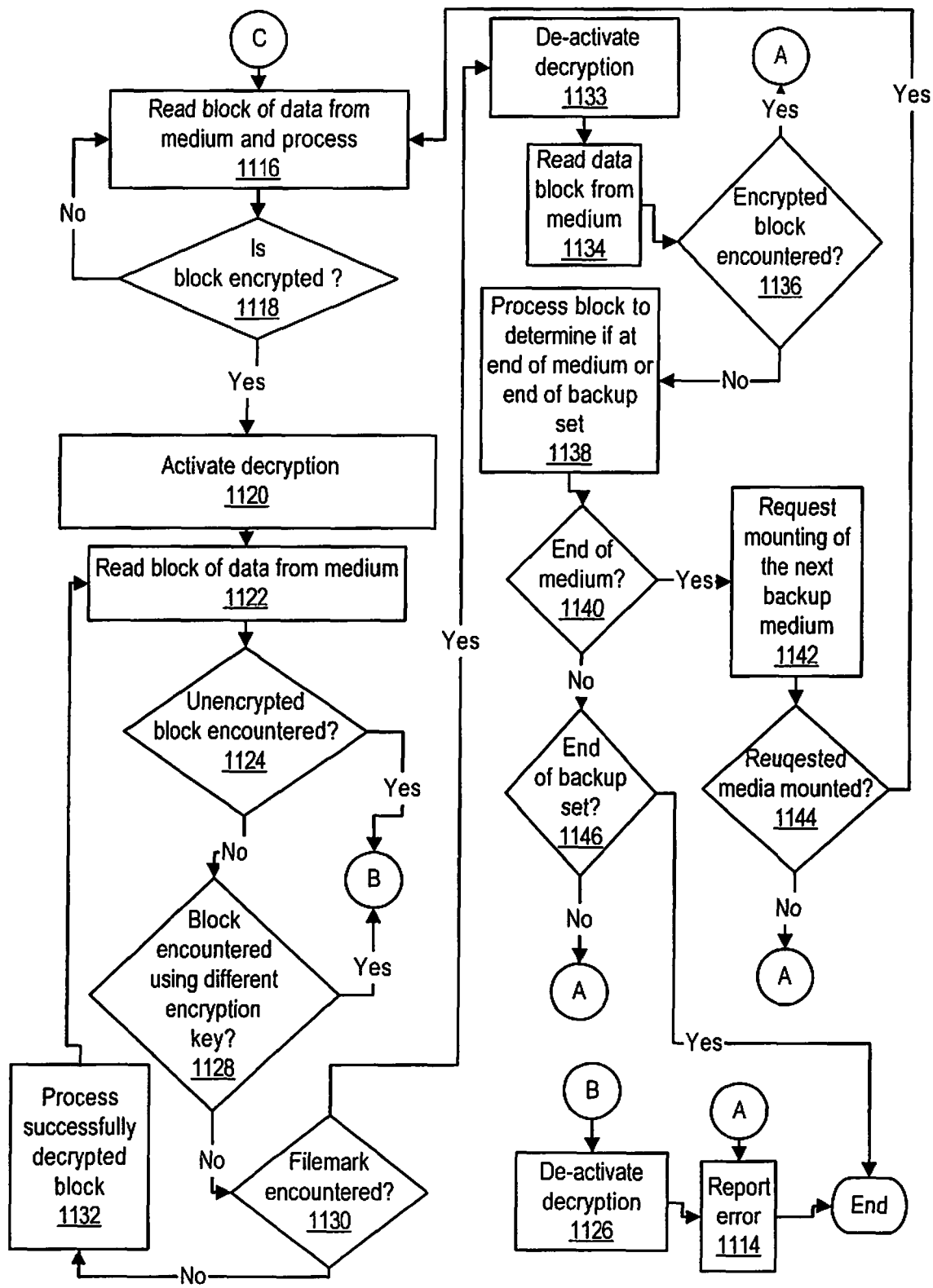
FIG. 11B is a second portion of a schematic flowchart of a method for extracting hardware encrypted backup data on a per-set basis, according to one embodiment of the present invention.

FIG. 11B is a second portion of a schematic flowchart of a method for extracting hardware encrypted backup data on a per-set basis, according to one embodiment of the present invention. After step 1112 of FIG. 11A, the process next moves to step 1116. Step 1116 illustrates media read-write hardware 306 reading a block of data from the medium and backup module 120(3) processing the block. The process then proceeds to step 1118, which depicts backup module 120(3) determining whether the block read in step 1116 is encrypted. If backup module 120(3) determines that the block read in step 1116 is not encrypted, the process returns to step 1116, which is described above. If, however, backup module 120(3) determines that the block read in step 1116 is encrypted, then the process proceeds to step 1120, which depicts hardware encryption and storage device 300 activating decryption.

The process next moves to step 1122, with media read-write hardware 306 reading a block of data from the medium. The process next moves to step 1124. Step 1124 illustrates backup module 120(3) determining whether an unencrypted block has been encountered. If backup module 120(3) determines that an unencrypted block has been encountered, then the process proceeds to step 1126, which depicts hardware encryption and storage device 300 de-activating decryption. The process then returns to step 1114, which is described above.

Returning to step 1124, if backup module 120(3) determines that an unencrypted block has not been encountered, then the process proceeds to step 1128. Step 1128 illustrates backup module 120(3) determining whether the current block uses a different encryption key than the key used to encrypt the current backup set. If backup module 120(3) determines that the current block uses a different encryption key than the key used to encrypt the current backup set, then the process proceeds to step 1126, which is described above. If backup module 120(3) determines that the current block does not use a different encryption key than the key used to encrypt the current backup set, then the process next moves to step 1130.

Step 1130 illustrates backup module 120(3) determining whether a filemark has been encountered. If backup module 120(3) determines that a filemark has not been encountered, then the process next moves to step 1132, which depicts backup module 120(3) processing a successfully decrypted block. The process then returns to step 1122, which is described above. Returning to step 1130, if backup module 120(3) determines that a filemark has been encountered, then the process next moves to step 1133. Step 1133 illustrates hardware encryption and storage device 300 de-activating decryption. The process then proceeds to step 1134, which depicts media read-write hardware 306 reading a block from the medium. The process next moves to step 1136. Step 1136 illustrates backup module 120(3) determining whether an encrypted block has been encountered. If backup module 120(3) determines that an encrypted block has been encountered, then the process proceeds to step 1114, which is described above. Returning to step 1136, if backup module 120(3) determines that an encrypted block has not been encountered, then the process proceeds to step 1138. Step 1138 illustrates backup module 120(3) processing the block to determine if the block represents the end of a medium or the end of a backup set.

The process then proceeds to step 1140, which illustrates backup module 120(3) determining whether the end of the medium has been reached. If backup module 120(3) determines that the end of the medium has been reached, then the process next moves to step 1142. Step 1142 depicts backup module 120(3) requesting mounting of a next backup medium. The process then proceeds to step 1144, which depicts backup module 120(3) determining whether the media requested in step 1142 is mounted. If backup module 120(3) determines that the requested media was not mounted, then the process proceeds to step 1114, which is described above. If, however, backup module 120(3) determines that the requested media is mounted, then the process proceeds to step 1116, which is also described above.

Returning to step 1140, if backup module 120(3) determines that the end of the medium has not been reached, then the process next moves to step 1146, which illustrates backup module 120(3) determining whether the end of the backup set has been reached. If backup module 120(3) determines that the end of the backup set has not been reached, then the process proceeds to step 1114, which is described above. If, however, backup module 120(3) determines that the end of the backup set has been reached, the process ends.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, said method comprising:
    generating a first hardware encrypted data set by encrypting a first data set, wherein
        said first data set comprises a first set of data backed up at a first time,
        said encrypting said first data set is performed using a first key,
        said encrypting said first data set is performed using a dedicated encryption circuit that is configured to implement a plurality of hardware-based encryption techniques, and
        said encrypting is performed using an initial data structure that comprises information regarding the first key, wherein
            said information comprises a hash of the first key to retrieve the first key;
    selecting a first hardware-based backup technique of a plurality of hardware-based backup techniques, wherein
        said first hardware-based backup technique is selected based on
            identifying a backup preference associated with a first backup client, and
            determining a connection status associated with said first backup client;
    storing a first hardware-encrypted data set in a first storage medium;
    generating an another hardware encrypted data set by encrypting a first portion and a second portion of an another data set, wherein
        said encrypting is performed using an another key, and
        said encrypting of said first and said second portions is performed using disparate hardware-based encryption techniques of said plurality of hardware-based encryption techniques; and
    storing said first portion of said another data set in said first storage medium, and
    upon performance of a media-span process, storing said second portion of said another data set in a second storage medium, wherein
        the second storage medium comprises
            an unencrypted data structure linking the second storage medium to the first storage medium.

2. The method of claim 1, wherein said storing said first data set in said first storage medium further comprises:
    performing a data set initialization process,
    writing an encrypted unit of said first data set to said first storage medium, and responsive to reaching an end of said first data set, performing an end of data set process.

3. The method of claim 2, further comprising:
performing said media-span process in response to detecting an end of said first storage medium.

4. The method of claim 3, wherein said performing said data set initialization process further comprises:
writing a first data structure containing an unencrypted encryption key name and hash;
writing a first pad to fill at least a first physical block on said first storage medium;
writing a first set of blocks to an item of read-write hardware;
flushing said first set of blocks to said first storage medium; and
activating encryption.

5. The method of claim 3, wherein said performing said media-span process further comprises:
flushing a first set of flush data to said first storage medium;
de-activating encryption;
writing a first filemark to said first storage medium;
writing a first unencrypted block with a second data structure to indicate an end of said first storage medium; and
writing a second filemark to said first storage medium.

6. The method of claim 3, wherein said step of performing said media-span process further comprises:
requesting said second storage medium;
responsive to availability of said second storage medium, writing a third data structure containing an unencrypted linking structure to link first data on said second storage medium to second data on said first storage medium;
writing a second pad to fill at least a second physical block on said second storage medium;
writing a second set of blocks to said second storage medium;
flushing said second set of blocks to said second storage medium; and
activating data encryption.

7. The method of claim 2, wherein said performing said end of data set process further comprises:
flushing a second set of flush data to said first storage medium;
de-activating encryption;
writing a third filemark to said first storage medium;
writing a second unencrypted block to indicate an end of said first data set;
flushing a third set of flush data to said first storage medium; and
activating encryption.

8. The method of claim 2, wherein said performing said end of data set further comprises:
writing a set of one or more encrypted catalog blocks comprising a catalog of said first data set;
flushing a third set of data to said first storage medium;
de-activating encryption;
writing an unencrypted catalog block, wherein
said unencrypted catalog block comprises a catalog of all backup sets written to said first medium, and
an entry supporting a data set comprises an encryption key name and hash associated with said backup set; and
writing to said first storage medium a fourth filemark.

9. The method of claim 2, wherein said storing said first data set on said first storage medium further comprises writing to said first storage medium a first storage structure comprising:

a first set of one or more unencrypted blocks, wherein
said first set of unencrypted blocks comprises a data structure, and
said data structure is configured to mark a beginning of said first data set; and
a first set of one or more encrypted data blocks.

10. The method of claim 9, wherein said storing said first data set on said first storage medium further comprises writing to said first medium a first storage structure comprising:
a fifth filemark, wherein
said fifth filemark is configured to separate said first set of one or more encrypted data blocks from a second set of one or more unencrypted blocks;
a second set of one or more unencrypted blocks containing one or more data structures; and
a first set of encrypted catalog blocks.

11. The method of claim 10, wherein:
said storing said another data set on said first storage medium further comprises writing to said first storage medium a second storage structure for said another data set, wherein
said second storage structure comprises
said first set of one or more unencrypted blocks configured to form a data structure, wherein
said data structure is configured to mark a beginning of said another data set,
said first set of one or more encrypted data blocks,
a third filemark separating said first set of one or more encrypted data blocks from an unencrypted data structure indicating an end of said first medium, wherein
said unencrypted data structure indicates said end of said first storage medium, and
a fourth filemark indicating said end of said first storage medium.

12. The method of claim 1, wherein said storing a third data set on said second storage medium further comprises writing to said second storage medium a third storage structure, said third storage structure comprising:
an unencrypted linking structure linking said second storage medium to said first storage medium,
a second set of one or more encrypted data blocks,
a fifth filemark configured to separate said second set of one or more encrypted data blocks from a third set of one or more unencrypted blocks containing one or more data structures an end of said third data set,
said third set of one or more unencrypted blocks containing one or more data structures configured to mark said end of said third data set,
a second set of encrypted catalog blocks,
a second set of unencrypted catalog blocks, and
a sixth filemark.

13. A computer program product in a non-transitory computer-readable medium, said computer program product comprising:
said non-transitory computer-readable medium,
instructions on said non-transitory computer-readable medium for generating a first hardware encrypted data set by encrypting a first data set, wherein said first data set comprises a first set of data backed up at a first time,
said encrypting said first data set is performed using a first key,
said encrypting said first data set is performed using a dedicated encryption circuit that is configured to implement a plurality of hardware-based encryption techniques, and said encrypting is performed using an initial data structure that comprises information regarding the first key, wherein
    said information comprises a hash of the first key to retrieve the first key;
instructions on selecting a first hardware-based backup technique of a plurality of hardware-based backup techniques, wherein
    said first hardware-based backup technique is selected based on
        identifying a backup preference associated with a first backup client, and
        determining a connection status associated with said first backup client;
instructions on said non-transitory computer-readable medium for storing a first hardware-encrypted data set in a first storage medium;
instructions on said non-transitory computer-readable medium for generating an another hardware encrypted data set by encrypting a first portion and a second portion of an another data set, wherein
    said encrypting is performed using an another key, and
    said encrypting of said first and said second portions is performed using disparate hardware-based encryption techniques of said plurality of hardware-based encryption techniques; and
instructions on said non-transitory computer-readable medium for storing said first portion of said another data set in said first storage medium, and
upon performance of a media-span process, storing said second portion of said another data set in a second storage medium, wherein
    the second storage medium comprises
        an unencrypted data structure linking the second storage medium to the first storage medium.

14. The computer program product of claim 13, wherein a data set comprises a first portion and a second portion, said first portion comprises a second data set, and said second portion comprises a third data set.

15. The computer program product of claim 13, wherein said instructions on said non-transitory computer-readable medium for storing said first data set in said first storage medium further comprise
    instructions on said non-transitory computer-readable medium for performing a data set initialization process,
    instructions on said non-transitory computer-readable medium for writing an encrypted unit of said first data set to said first storage medium, and
    instructions on said non-transitory computer-readable medium for, responsive to reaching an end of said first data set, performing an end of data set process.

16. An apparatus, said apparatus comprising:
a processor;
means for causing said processor to generate a first hardware encrypted data set by encrypting a first data set, wherein
    said first data set comprises a first set of data backed up at a first time,
    said means for causing said processor to encrypt said first data set employs a first key,
    said means for causing said processor to encrypt said first data set comprises a dedicated encryption circuit that is configured to implement a plurality of hardware-based encryption techniques, and
    said encrypting is performed using an initial data structure that comprises information regarding the first key, wherein
        said information comprises a hash of the first key to retrieve the first key;
means for selecting a first hardware-based backup technique of a plurality of hardware-based backup techniques, wherein
    said first hardware-based backup technique is selected based on
        identifying a backup preference associated with a first backup client, and
        determining a connection status associated with said first backup client;
means for causing said processor to store a first hardware-encrypted data set in a first storage medium;
means for causing said processor to generate an another hardware encrypted data set by encrypting a first portion and a second portion an another data set, wherein
    said means for causing said processor to encrypt said another data set employs an another key, and
    said means for causing said processor to encrypt said first and second portions is performed using disparate hardware-based encryption techniques of the plurality of hardware-based encryption techniques; and
means for causing said processor to store said first portion of said another data set in said first storage medium, and
upon performance of a media-span process, storing said second portion of said another data set in a second storage medium, wherein
    the second storage medium comprises
        an unencrypted data structure linking the second storage medium to the first storage medium.

17. The method of claim 1, further comprising:
reading a block from said first storage medium; and
determining whether a current encryption key matches an associated encryption key, wherein
    the associated encryption key was used to encrypt the block.

18. The method of claim 1, further comprising:
specifying a value, wherein
    said value indicates whether said first data set is encrypted using hardware encryption.

19. The method of claim 1, comprising
generating a second hardware encrypted data set by encrypting a second data set, wherein
    said second data set comprises a second set of data backed up at a second time,
    said first time is different from said second time,
    said encrypting said second data set is performed using a second key, and
    said encrypting said second data set is performed using said dedicated encryption circuit that is configured to implement said plurality of hardware-based encryption techniques; and
storing said second hardware-encrypted data set in said first storage medium.

20. The method of claim 1, wherein
the encryption of the first portion and the second portion of the another data set is deactivated, and
the encryption of the first portion and the second portion of the another data set is activated after performance of the media-span process.

21. The method of claim 1, wherein
said first data set is associated with a first set of encrypted data blocks, and
a second data set is associated with a second set of encrypted data blocks, wherein
the second set of encrypted data blocks are part of the first set of encrypted data blocks.

22. The method of claim 1, wherein
the unencrypted data structure identifies:
a third key, and
a plurality of data sets backed up in the first storage medium and the second storage medium.

23. The method of claim 1, wherein
said information regarding the first key further comprises:
an identifier for a group of storage mediums, and
a name of said first key used for said first data set.

* * * * *

UNITED STATES PATENT AND TRADEMARK OFFICE
CERTIFICATE OF CORRECTION

PATENT NO.         : 9,064,132 B1
APPLICATION NO.    : 12/059629
DATED              : June 23, 2015
INVENTOR(S)        : Laird et al.

Page 1 of 1

It is certified that error appears in the above-identified patent and that said Letters Patent is hereby corrected as shown below:

Column 11
Line 52, Claim 8, replace: "set further" by -- set process further --
Line 59, Claim 8, replace: "first medium" by -- first storage medium --
Line 61, Claim 8, replace: "said backup set" by -- each backup set --

Column 12
Line 9, Claim 10, replace: "first medium" by -- first storage medium --
Line 31, Claim 11, replace: "first medium" by -- first storage medium --

Column 14
Line 59, Claim 19, replace: "second hardware-encrypted data" by -- second hardware encrypted data --

Signed and Sealed this
Third Day of May, 2016

Michelle K. Lee
*Director of the United States Patent and Trademark Office*